(12) United States Patent  
Schloegel

(10) Patent No.: US 7,159,886 B2  
(45) Date of Patent: Jan. 9, 2007

(54) FREESTYLE PEGS FOR MOTORCYCLES

(76) Inventor: Douglas Schloegel, P.O. Box 44, Gaines, PA (US) 16921

( * ) Notice: Subject to any disclaimer, the term of this patent is extended or adjusted under 35 U.S.C. 154(b) by 155 days.

(21) Appl. No.: 10/986,204

(22) Filed: Nov. 12, 2004

(65) Prior Publication Data

US 2005/0120824 A1 Jun. 9, 2005

Related U.S. Application Data

(60) Provisional application No. 60/527,008, filed on Dec. 5, 2003.

(51) Int. Cl.
- *B62J 25/00* (2006.01)
- *B62H 1/00* (2006.01)
- *G05G 1/18* (2006.01)

(52) U.S. Cl. .................. 280/291; 280/288.4; 74/564

(58) Field of Classification Search ............ 280/288.4, 280/291; 74/564  
See application file for complete search history.

(56) References Cited

U.S. PATENT DOCUMENTS

| 4,638,682 | A | | 1/1987 | Michiyama |
| 4,771,651 | A | | 9/1988 | Haro |
| 5,454,580 | A | | 10/1995 | Lin |
| 5,638,723 | A | | 6/1997 | Lin |
| 5,826,900 | A | | 10/1998 | Steele |
| 5,884,983 | A | * | 3/1999 | Wu .......................... 301/124.1 |
| 5,997,023 | A | | 12/1999 | Sauter |
| 6,070,897 | A | * | 6/2000 | Hsieh et al. ................. 280/291 |
| 6,129,370 | A | * | 10/2000 | Hsieh et al. ................. 280/291 |
| 6,142,499 | A | * | 11/2000 | Hsieh et al. ................. 280/291 |
| 6,149,177 | A | * | 11/2000 | Valdez ....................... 280/291 |
| 6,193,255 | B1 | * | 2/2001 | Lo .............................. 280/291 |
| 6,199,887 | B1 | * | 3/2001 | Lee ............................ 280/291 |
| 6,247,761 | B1 | * | 6/2001 | Lin ........................... 301/124.1 |
| 6,485,044 | B1 | * | 11/2002 | Blake ....................... 280/288.4 |
| 6,499,378 | B1 | * | 12/2002 | Ho .............................. 74/564 |
| 6,783,143 | B1 | * | 8/2004 | Hung ......................... 280/291 |
| 2003/0095414 | A1 | | 5/2003 | Tracey |
| 2003/0132592 | A1 | * | 7/2003 | Dombroski ............. 280/87.01 |
| 2004/0222613 | A1 | * | 11/2004 | Cramer ...................... 280/291 |

* cited by examiner

*Primary Examiner*—Lesley D. Morris  
*Assistant Examiner*—Marc A. Scharich  
(74) *Attorney, Agent, or Firm*—Richard C. Litman

(57) ABSTRACT

Freestyle pegs for a motorcycle. The pegs permit the motorcycle rider to perform stunts in the same way stunts are performed on a bicycle. Each peg includes two axially aligned, interconnected cylindrical members. The members are coaxial with the axle of the motorcycle and extend outwardly therefrom. As contemplated, the pegs will be disposed on both front and rear axles.

9 Claims, 7 Drawing Sheets

FREESTYLE PEGS FOR MOTORCYCLES

CROSS-REFERENCE TO RELATED APPLICATION

This application claims the benefit of U.S. Provisional Patent Application Ser. No. 60/527,008, filed Dec. 5, 2003.

BACKGROUND OF THE INVENTION

1. Field of the Invention

The present invention relates to wheel axle pegs, and particularly to a motorcycle axle peg that enables a rider to perform particular stunts while operating the motorcycle.

2. Description of the Related Art

Freestyle bike riding and stunt performance have long been sources of thrills and entertainment. From wheelies to endos, bike stunts require a great deal of skill, and in some cases, special equipment. One piece of equipment sometimes used for bicycle stunts is an axle peg. Pegs extend out from the axle or forks of the front and rear bike wheels and allow a rider to perform stunts such as sliding down a handrail or standing on the pegs while riding the bike. A similar device adapted for use with motorcycles would enable a motorcycle rider to perform these stunts and many more.

The related art (as indicated in the accompanying IDS) discloses many foot pegs mounted on motorcycle frames. These pegs are positioned so that the rider can rest his feet when desired. Such positioning would militate against stunt performance. Note that the related art shows foot pegs closely adjacent the wheel axle on bicycles used in stunt riding.

None of the above inventions and patents, taken either singly or in combination, is seen to disclose freestyle pegs for motorcycles as will subsequently be described and claimed in the instant invention.

SUMMARY OF THE INVENTION

The instant invention is drawn to freestyle pegs for a motorcycle. The pegs permit the motorcycle rider to perform stunts in the same way stunts are performed on a bicycle. Each peg includes two axially-aligned, interconnected, cylindrical members. The members are coaxial with the axle of the motorcycle and extend outwardly therefrom. As contemplated, the pegs will be disposed on both front and rear axles.

Accordingly, the invention provides freestyle pegs for motorcycles that enable a rider to perform various stunts while operating the motorcycle. The peg structure is strong, durable and warp-resistant. The pegs are easy to attach to the motorcycle wheels and the peg structure functions as a wheel axle.

The invention provides improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
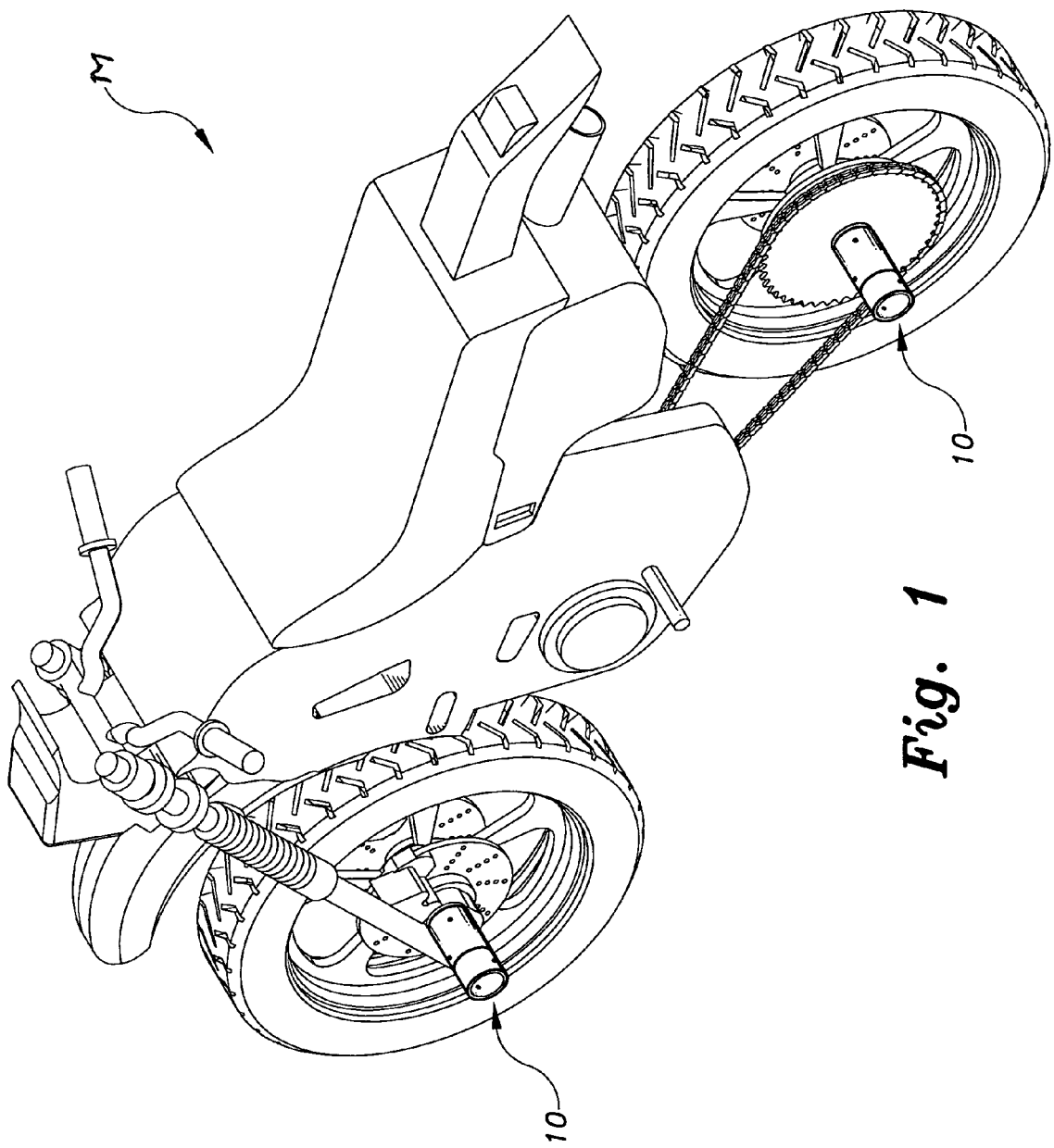
FIG. 1 is an environmental, perspective view of a motorcycle equipped with the freestyle pegs for motorcycles according to the present invention.
Figure 2:
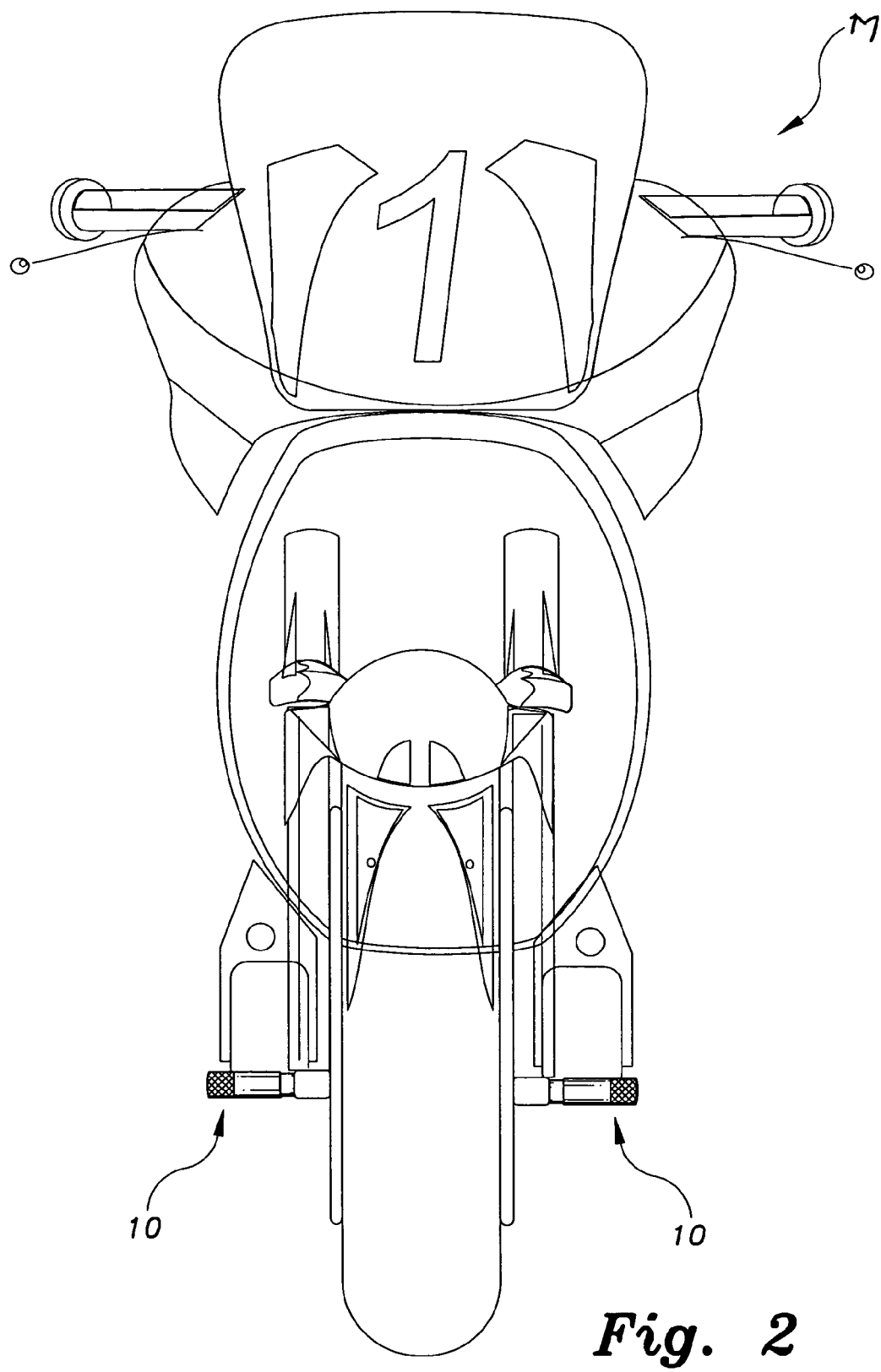
FIG. 2 is a front, environmental view of the freestyle pegs for motorcycles according to the present invention.

The present invention is directed to freestyle pegs for motorcycles, designated generally as 10 in the drawings. The freestyle pegs 10 are shown mounted to a motorcycle M in FIGS. 1 and 2. The freestyle pegs 10 are designed to enable a motorcycle rider to perform stunts, such as standing on the pegs, or hooking the pegs onto the side of a half-pipe.

Figure 3:
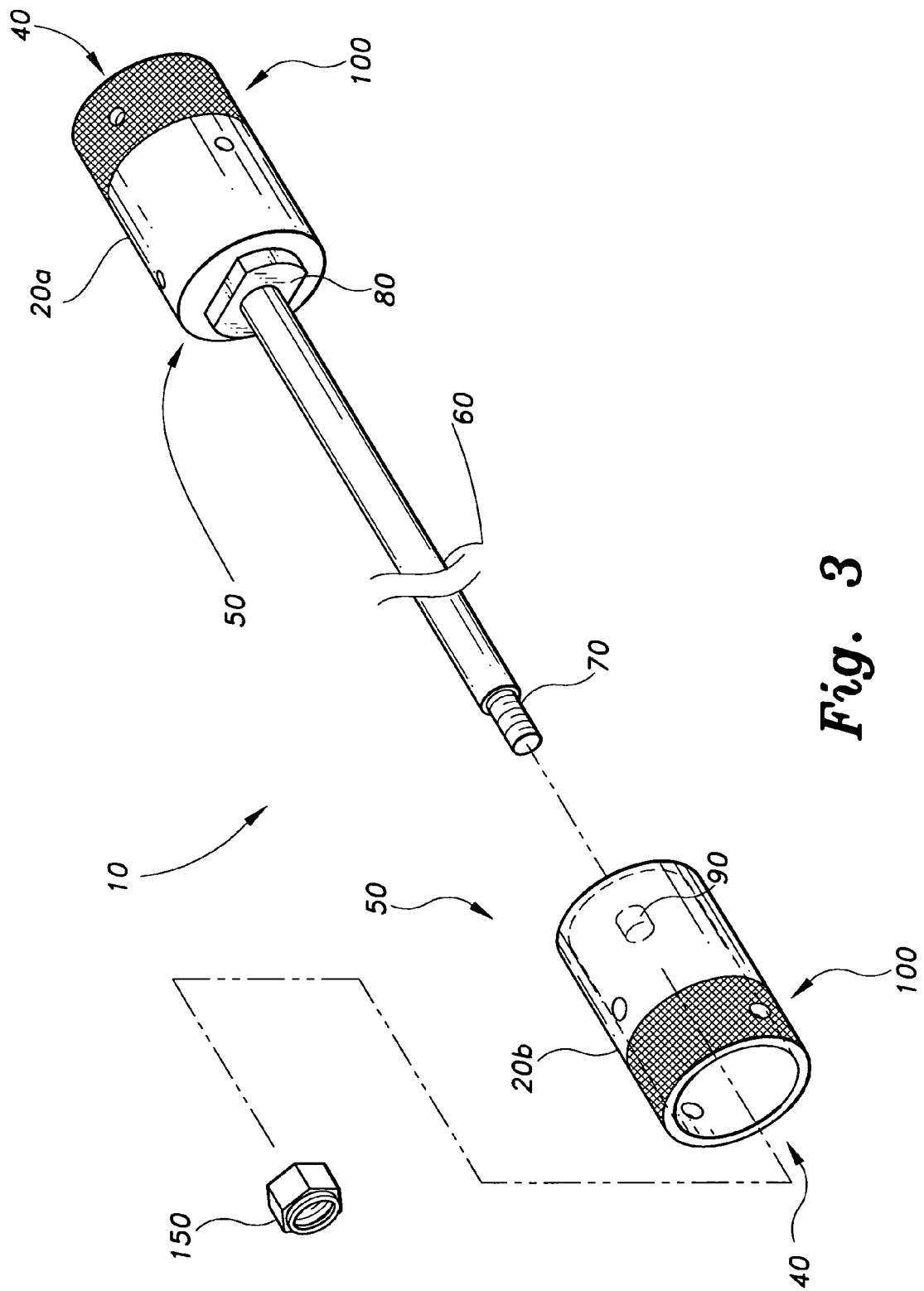
FIG. 3 is an exploded view of a first embodiment of the freestyle pegs for motorcycles according to the present invention.

Referring to FIG. 3, the freestyle pegs 10, include first and second cylindrical members 20a and 20b. Each respective member has an open end 40 and a closed end 50. A connecting rod 60, having a threaded distal end 70, extends from the closed end 50 of the first cylindrical member 20a. The proximate end of connecting rod 60 extends through a peg lock 80 and is attached to the closed end of first cylindrical member 20a. The closed end of second cylindrical member 20b is provided with a bore 90, which bore receives the distal threaded end 70 therethrough. A lock nut 150 is tightened onto the threaded end 70 to secure the connecting rod 60 to the second cylindrical member 20b. Each cylindrical member 20a, 20b is provided with a knurled predetermined outer surface area 100 to provide traction for a rider's shoes. Other options include parallel grooves along the circumferential planes of the cylindrical members or a combination of knurls and grooves. If desired, circular holes may be provided in the cylindrical members for aesthetic enhancement and/or for weight savings. The cylindrical members 20a, 20b and connecting rod 60 are preferably made of stainless steel or other high-strength, resilient metal that is capable of supporting the rider and motorcycle. Connecting rod 60 can be hollow, semi-hollow or solid as long as it is of the required necessary strength.

In use, the freestyle motorcycle pegs 10 are attached to the motorcycle by removing the wheel axle and inserting the connecting rod 60 through the passage formerly occupied by the axle. Once the second cylindrical member (20b) is attached to the connecting rod, it is tightened into position against the side of the wheel, creating a tight fit between the cylindrical members and the wheel sides. The cylindrical members extend outwardly from the wheel and are disposed on opposite sides of the wheel (FIG. 2), allowing the rider to perform various stunts, such as standing on the pegs while riding the motorcycle, or hooking the pegs onto the edge of a half-pipe.

Figure 4:
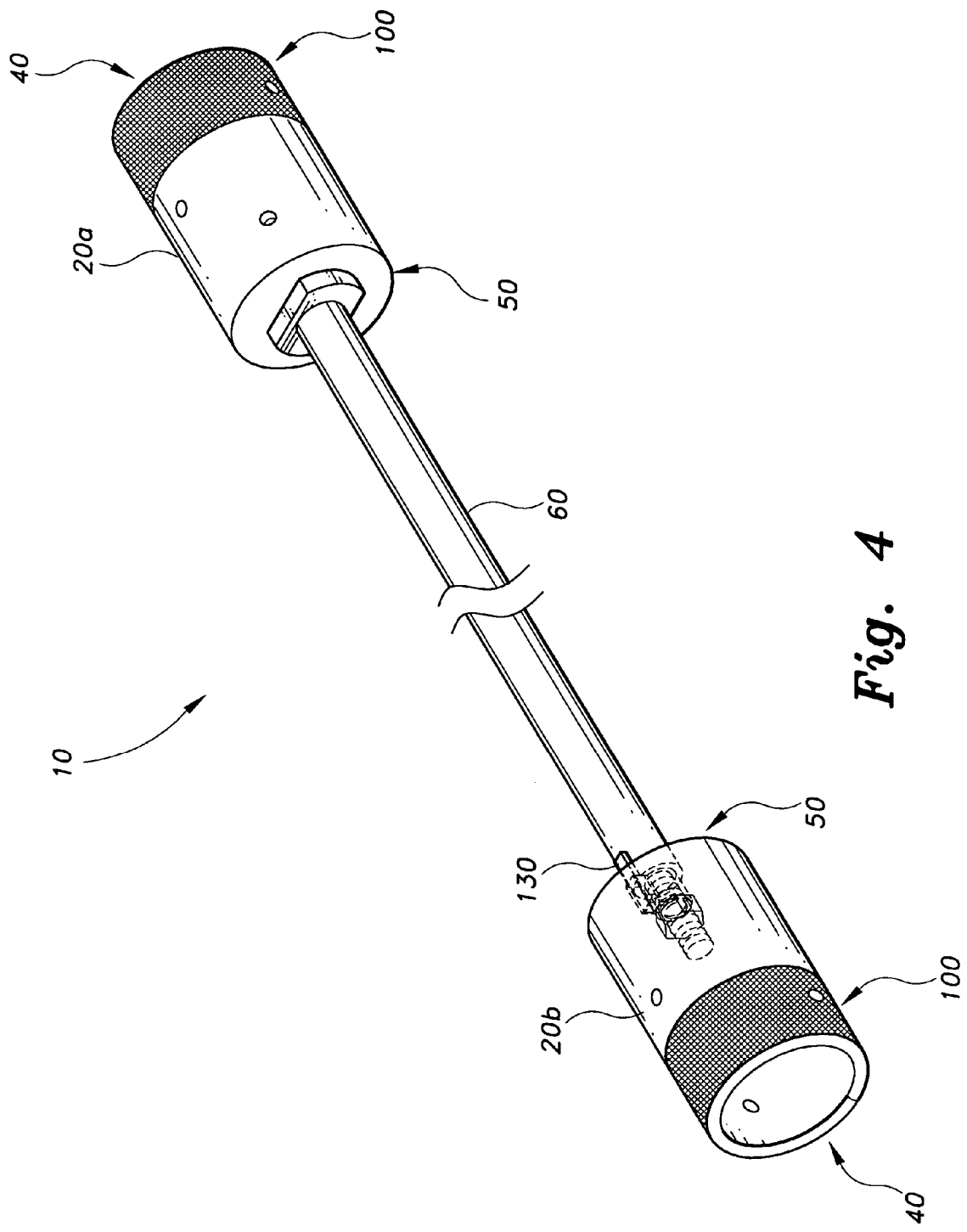
FIG. 4 is a perspective view of a second embodiment of the freestyle pegs for motorcycles according to the present invention.
Figure 5:
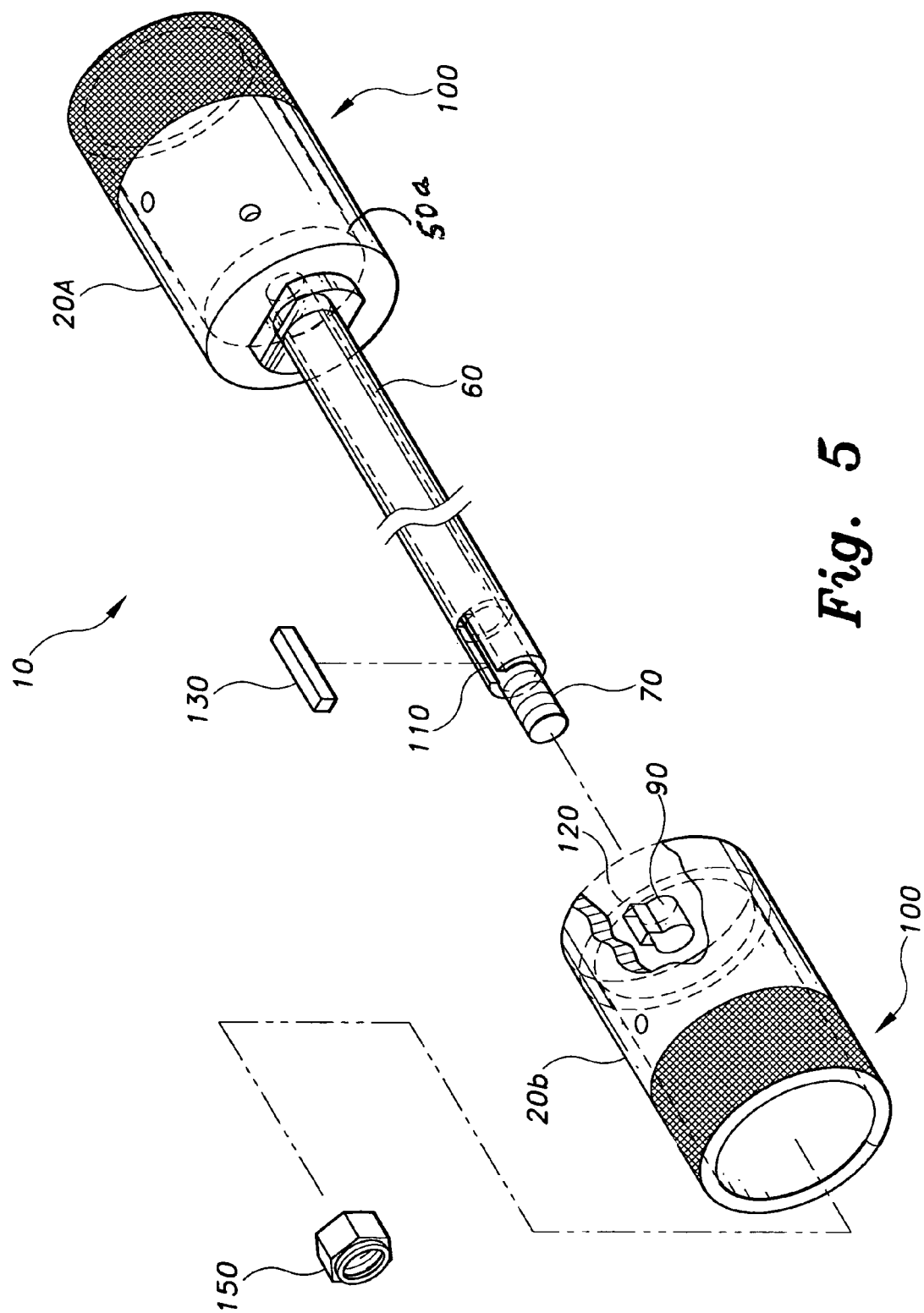
FIG. 5 is an exploded, perspective view of the freestyle pegs for motorcycles of FIG. 4.

In the embodiment shown in FIGS. 4 and 5, the connecting rod 60 has a keyway slot 110 disposed above and behind the threaded end 70. The threaded end 70 is inserted into the bore 90 in the second cylindrical member 20b in such a way that the keyway slot 110 aligns with a second keyway slot 120 disposed above the smooth bore 90. A rectangular key 130 is inserted into the keyway slots. The size of the key is such that a portion of it extends into both keyway slots 110 and 120, thereby preventing rotational movement between the second cylindrical member 20b and the connecting rod 60. The closed end 50a of first cylindrical member 20a is recessed.

Figure 6A:
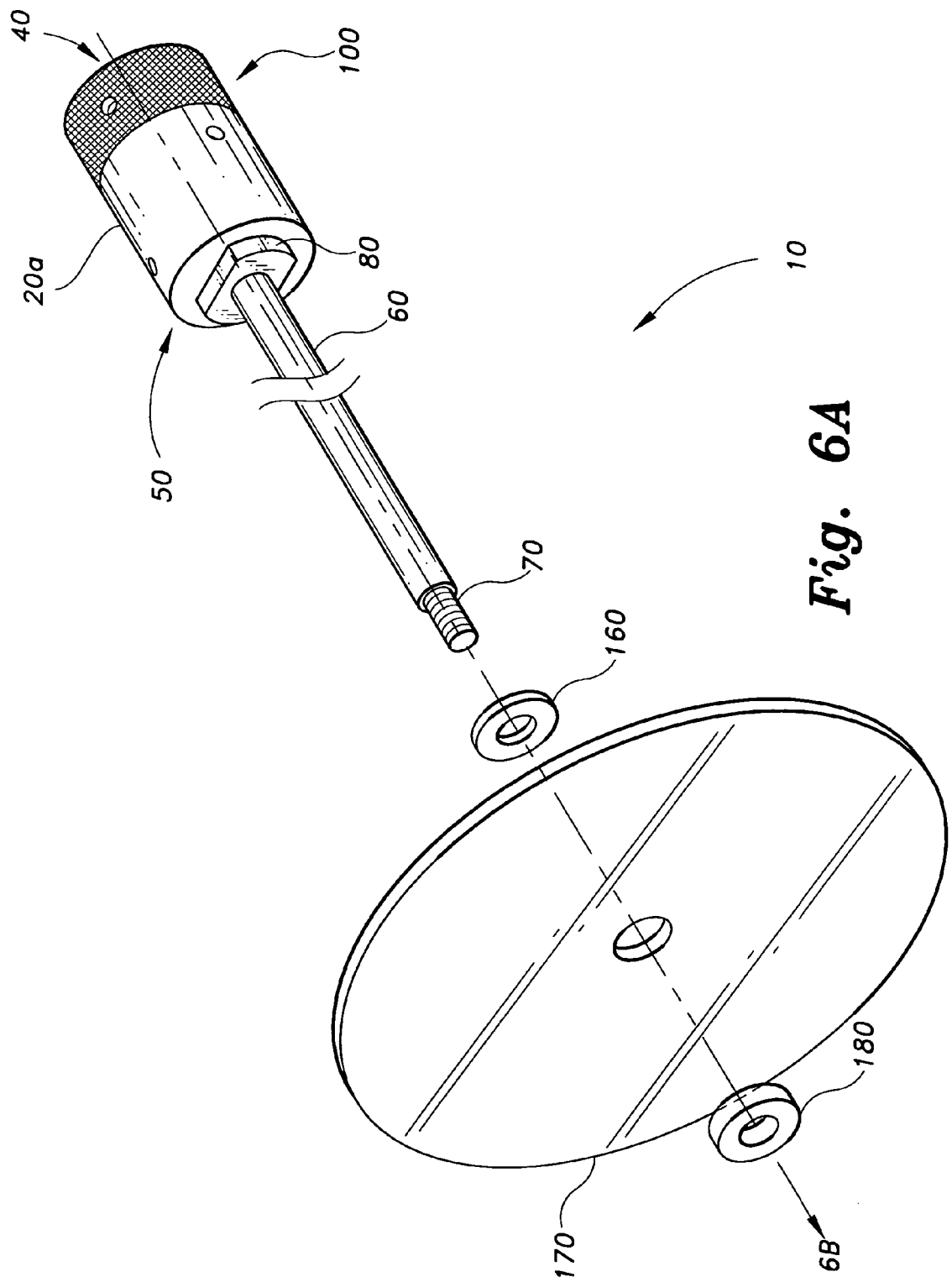
FIGS. 6A and 6B are exploded, perspective views of a third embodiment of the freestyle pegs for motorcycles according to the present invention.
Figure 6B:
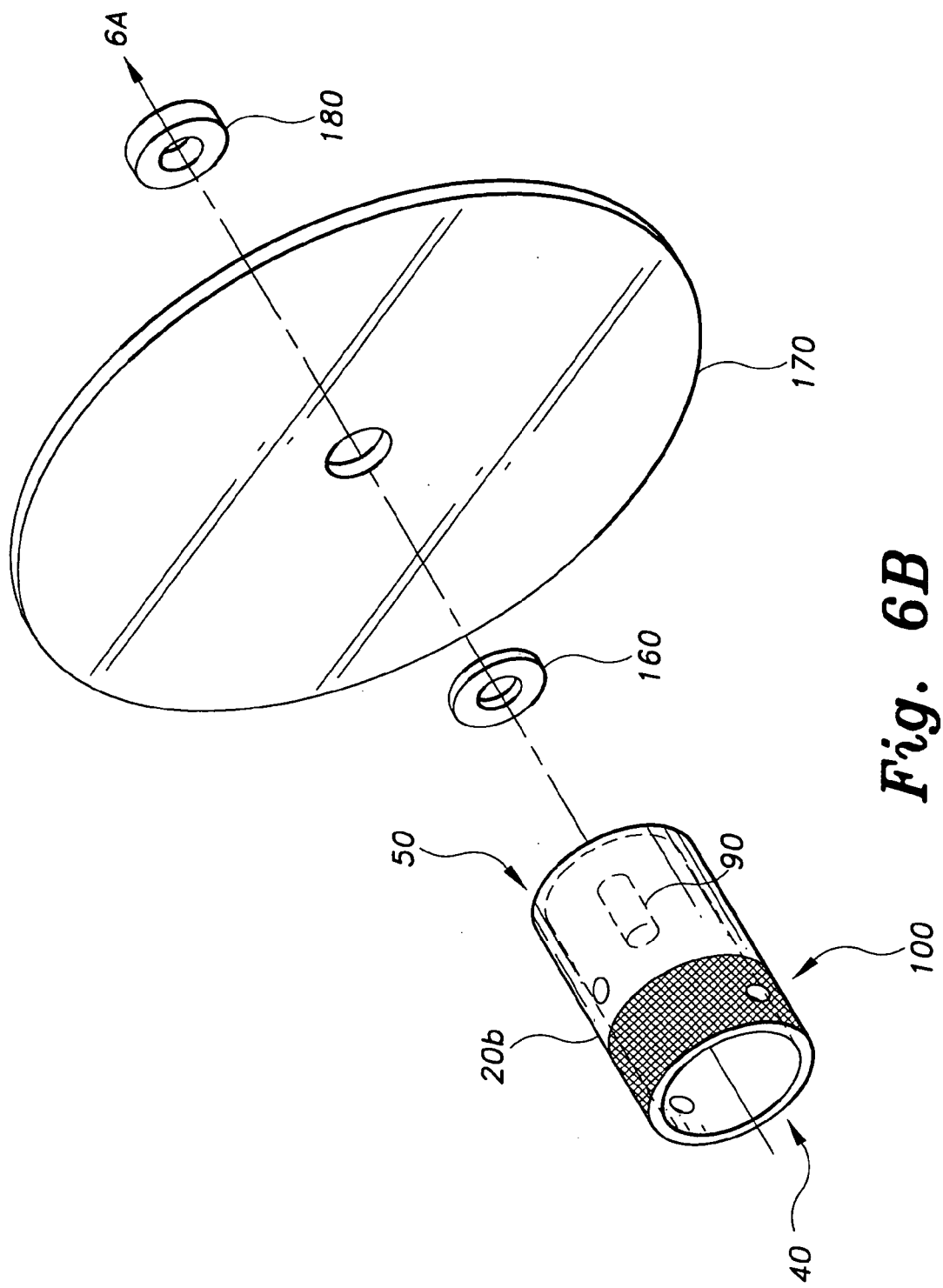

A third embodiment, shown exploded in FIGS. 6A and 6B, employs respective washers 160, disk guards 170 and spacers 180. The aforementioned elements function to enhance stability of the structure. When assembled, each cylindrical member will have a respective washer 160, disk guard 170 and spacer 180 adjacent thereto. It is to be understood that the present invention is not limited to the embodiments described above, but encompasses any and all embodiments within the scope of the following claims.

I claim:

1. A freestyle peg for a motorcycle, comprising:
   a first cylindrical member having an open end and a closed end;
   a peg lock attached to said closed end of the first cylindrical member;
   a connecting rod, said connecting rod having a proximate end and a threaded distal end, said proximate end extending through said peg lock and attached to said closed end of said first cylindrical member;
   a second cylindrical member having an open end and a closed end;
   a smooth bore formed in said closed end of said second cylindrical member, wherein said distal end of said connecting rod extends through said smooth bore and is attached to the closed end of said second cylindrical member, wherein a first keyway slot is formed in said connecting rod adjacent said threaded distal end and a second keyway slot is formed in said smooth bore.

2. A freestyle peg for a motorcycle as recited in claim 1, including a locknut employed to attach the distal end to the closed end of said second cylindrical member.

3. A freestyle peg for a motorcycle as recited in claim 1, wherein said first cylindrical member and said second cylindrical member have respective outer surface areas, and wherein a portion of said areas is knurled.

4. A freestyle peg for a motorcycle as recited in claim 1 including, a key adapted for insertion into said first keyway slot and said second keyway slot.

5. The combination of a freestyle peg and a motorcycle, said motorcycle having a wheel with an axle cavity, comprising:
   a first cylindrical member having an open end and a closed end;
   a peg lock attached to said closed end of the first cylindrical member;
   a connecting rod disposed in said axle cavity, said connecting rod having a proximate end and a distal end, said proximate end extending through said peg lock and attached to said closed end of said first cylindrical member;
   a second cylindrical member having an open end and a closed end, said distal end of said connecting rod is attached to the closed end of said second cylindrical member.

6. The combination as recited in claim 5, wherein said distal end of said connecting rod is threaded and including a locknut employed to attach the distal end to the closed end of said second cylindrical member.

7. The combination as recited in claim 5, wherein said first cylindrical member and said second cylindrical member have respective outer surface areas, and wherein a portion of said areas is knurled.

8. The combination as recited in claim 5, wherein the closed end of said first cylindrical member is recessed in said first cylindrical member.

9. The combination as recited in claim 5, wherein said closed end of said second cylindrical member has a smooth bore therein and wherein said distal end of said connecting rod extends through said smooth bore.

\* \* \* \* \*